(12) United States Patent
Pera et al.

(10) Patent No.: US 7,974,734 B2
(45) Date of Patent: Jul. 5, 2011

(54) METHOD AND SYSTEM TO CHECK AN ELECTRONIC METROLOGICAL MEASUREMENT INSTRUMENT

(75) Inventors: Raffaele Pera, Valgreghentino (IT); Mirko Spagnolatti, Berbenno di Valtellina (IT); Giorgio Della Fonte, Berbenno di Valtellina (IT)

(73) Assignee: Dresser, Inc., Addison, TX (US)

( * ) Notice: Subject to any disclaimer, the term of this patent is extended or adjusted under 35 U.S.C. 154(b) by 1146 days.

(21) Appl. No.: 10/534,679

(22) PCT Filed: Nov. 13, 2003

(86) PCT No.: PCT/EP03/12826
§ 371 (c)(1),
(2), (4) Date: Nov. 22, 2005

(87) PCT Pub. No.: WO2004/046016
PCT Pub. Date: Jun. 3, 2004

(65) Prior Publication Data
US 2006/0266245 A1 Nov. 30, 2006

(30) Foreign Application Priority Data
Nov. 15, 2002 (IT) .............................. MI2002A2419

(51) Int. Cl.
*G06F 17/00* (2006.01)
(52) U.S. Cl. ........ 700/231; 700/237; 700/241; 700/266; 700/295; 705/76; 705/78; 702/61; 380/47; 380/251; 380/287; 726/4; 726/6; 713/155; 713/156; 713/157; 713/175; 713/176; 713/169; 713/180; 713/182; 713/192; 713/194

(58) Field of Classification Search .................. 713/175
See application file for complete search history.

(56) References Cited

U.S. PATENT DOCUMENTS

| | | | | |
|---|---|---|---|---|
| 6,119,110 A * | 9/2000 | Carapelli | ....................... | 705/413 |
| 6,292,569 B1 * | 9/2001 | Shear et al. | .................... | 380/255 |
| 6,360,138 B1 * | 3/2002 | Coppola et al. | ............... | 700/231 |
| 6,442,448 B1 * | 8/2002 | Finley et al. | .................. | 700/231 |
| 6,904,592 B1 * | 6/2005 | Johnson | ....................... | 717/168 |
| 7,376,934 B2 * | 5/2008 | Steinrisser et al. | ........... | 717/109 |
| 2003/0196102 A1 * | 10/2003 | McCarroll | .................... | 713/194 |

FOREIGN PATENT DOCUMENTS

| | | |
|---|---|---|
| EP | 0736484 A1 | 10/1996 |
| GB | 2342453 | 4/2000 |

OTHER PUBLICATIONS

Patent Abstracts of Japan vol. 1995, No. 1, Feb. 28, 1995, JP 06 300603 A (Ricoh Seiki Co Ltd), Oct. 28, 1994.
International Search Report for PCT/EP2003/12826 prepared by the European Patent Office on Apr. 7, 2004 and mailed on Jun. 21, 2004.

* cited by examiner

*Primary Examiner* — William Korzuch
*Assistant Examiner* — Bryan Wright
(74) *Attorney, Agent, or Firm* — Fish & Richardson P.C.

(57) ABSTRACT

Control system of an electronic instrument for metrological measurements, comprising an electronic local processing unit including a handling application of said instrument. The system includes a control application for said handling application, which can be associated with said local processing unit, said control application being suitable for generating a univocal certification code for the application.

21 Claims, 5 Drawing Sheets

METHOD AND SYSTEM TO CHECK AN ELECTRONIC METROLOGICAL MEASUREMENT INSTRUMENT

CROSS REFERENCE TO RELATED APPLICATIONS

This application is a National Stage application under 35 U.S.C. §371 that claims the benefit of PCT/EP2003/012826, filed Nov. 13, 2003, which claims the benefit of Italian Patent Application Serial No. MI2002A002419 filed Nov. 15, 2002. This application claims priority to International Application Serial No. PCT/EP2003012826 and Italian Patent Application Serial No. MI2002A002419.

TECHNICAL FIELD

The present invention relates to a method and system for controlling an electronic instrument for metrological measurements.

BACKGROUND OF THE INVENTION

As is known, metric instruments are, according to the law, subjected to periodic controls which consist in ascertaining their constant metrological reliability with time, with the aim of protecting the integrity of seals, also electronic, and labels or other protection elements envisaged by the law in force.

An authorized person (metric officer) is charged with performing these controls, which refer, for example, to the integrity of both the structure of the measuring instrument, and also to that of the applications or processing programs contained in said instrument.

Integrity of the applications means that the applications have not been subjected to interventions which can alter the integrity and originality of the software application which runs the instrument for metrological measurement.

Said seals which guarantee the integrity and originality of the application are currently of the hardware type, for example lead seals.

BRIEF SUMMARY OF THE INVENTION

In particular, the present invention relates to a method and system for controlling electronic instruments for metrological measurements including an application for handling the measurement effected by the instrument.

Said instrument for metrological measurements can be, for example, an instrument situated inside a gasoline pump, suitable for measuring the flow of gasoline.

For the purposes of the present invention, application for handling the metrological measurement means a software or a processing program which can acquire, process, visualize and print the data relating to the measurement effected.

The Applicant has observed that for these controls the operator (metric officer) must go to the place where the measurement instrument is installed and check the integrity of said hardware seals. Should the supplier of the application issue a new updated version of said application, the metric officer must go on site to remove said seals and insert the new ones, after verifying the correct functioning of the updated version of the application.

The intention of the Applicant is to simplify certification operations of software applications for electronic instruments for simple metrological measurements and make them reliable.

The Applicant has achieved a method and system for controlling an electronic instrument for metrological measurements, wherein a control application, residing on a computer connected to said measurement instrument, for example through a network, checks whether the handling application of the measurement effected by the instrument has undergone alterations, violations, modifications or similar variations. This control of the handling application of the instrument results in the emission of an authenticity stamp.

The control application preferably determines whether the handling applications satisfy the following conditions:

the handling application installed on the instrument must conform with what is certified at the start of the instrument;

the handling application installed on the instrument cannot be unduly interfered with;

any variation in the handling application installed on the instrument must be evident and acknowledgeable;

the presence of a different handling application must be acknowledgeable;

the techniques adopted must guarantee that all the aforesaid actions are carried out in a context of data security, using suitable cryptography techniques, digital signatures, certifications etc.;

all relevant actions in the sphere of variations in the programs which can be effected by the instrument, must be marked on carriers that cannot be modified by third parties.

The controls are generally such as to allow a definite reconstruction of the actions effected on the handling application of the instrument.

An aspect of the present invention relates to the controlling system of an electronic instrument for metrological measurements, including a local processing computer which comprises a handling application of said instrument, characterized in that it includes a control application for said handling application, which can be associated with said local computer, said control application being suitable for generating a univocal certification code for the application.

A further aspect of the present invention relates to a method for controlling an electronic instrument for metrological measurements, said instrument being associated with a local processing computer including a handling application of said instrument, comprising the following steps:

receiving, at the start of the handling application, information contained in said local unit referring to the handling application;

processing said information through a comparison with pre-memorized information;

issuing a univocal certification code which can be associated with said handling application;

printing on paper a stamp containing said univocal code.

The characteristics and advantages of the method and system for controlling metrological measurement instruments according to the present invention will be better clarified and appear more evident from the following illustrative and non-limiting description of an embodiment, with reference to the attached figures, wherein:

DETAILED DESCRIPTION OF INVENTION

With reference to the aforesaid figures, the system according to the present invention preferably comprises a central processing unit (server) (2), and at least one local processing unit (3) in which there is at least one handling application of a metric instrument (4). This central processing unit preferably also includes a handling application of a metric instrument (4).

The connection between said central unit and the local units is preferably obtained through a traditional telecommunication network, a LAN network, for example, an Ethernet network, or an Internet connection. In general said network allows applications and programs, physically residing in a memory of said central processing unit, to be used in said local units.

Figure 1:
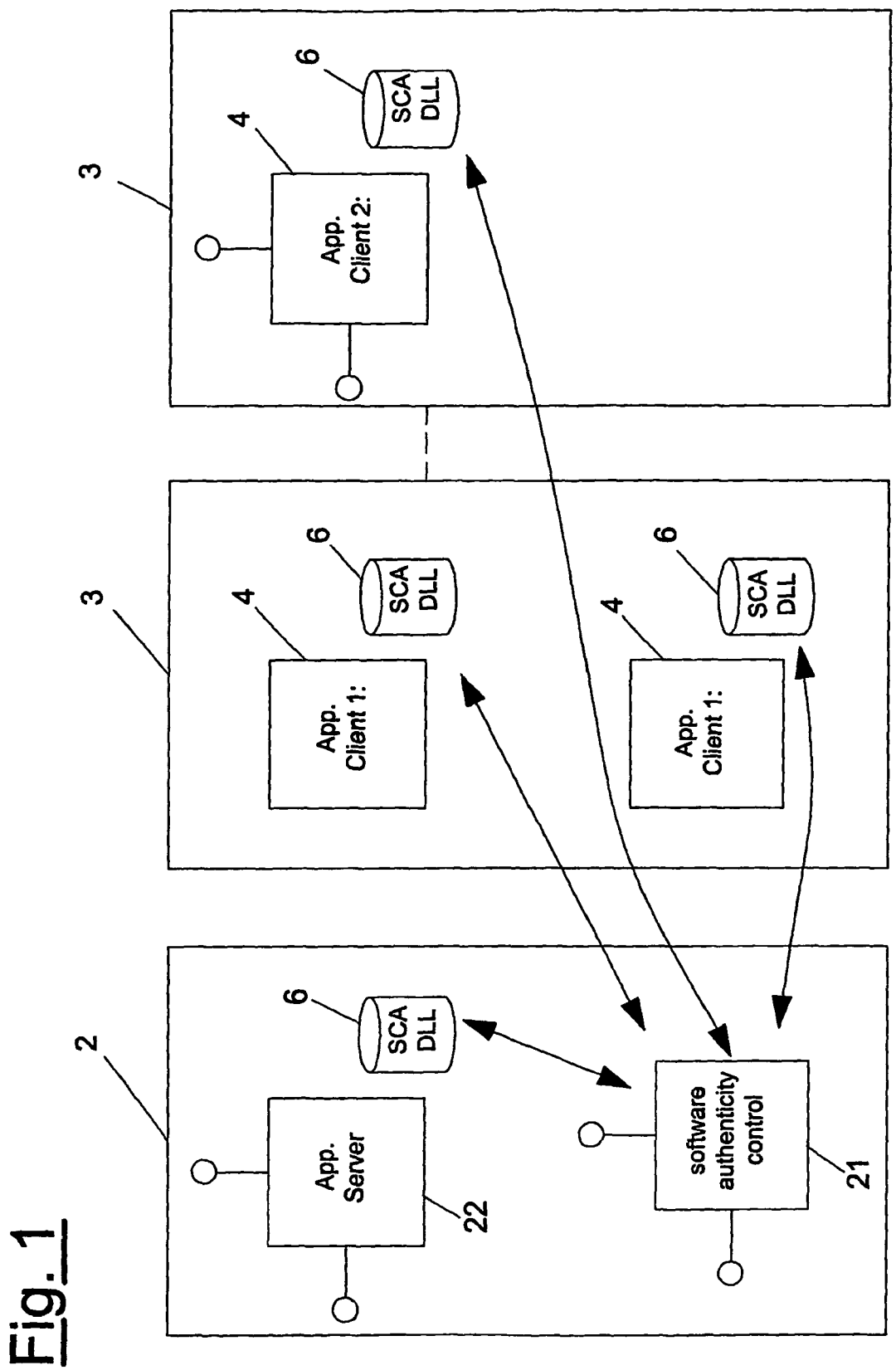
FIG. 1 is a block scheme of the control system according to the present invention applied to generic client uses.

FIG. 1 shows, as an example, three local stations, as the system of the present invention is also capable of controlling a series of local units contemporaneously. One of the local units indicated in FIG. 1 comprises two handling applications (4) of an electronic instrument for metrological measurements, as the system of the present invention contemporaneously and equivalently controls one or more applications inside the local unit itself.

Said central processing unit preferably includes at least one control application (21) of said handling applications, in addition to at least one central application (22).

At least one dynamic library (6) of functions which can be associated with said control application (21), is preferably present on both the central processing unit and the local units, said library acting as a connection between the handling applications and the control application.

Figure 2:
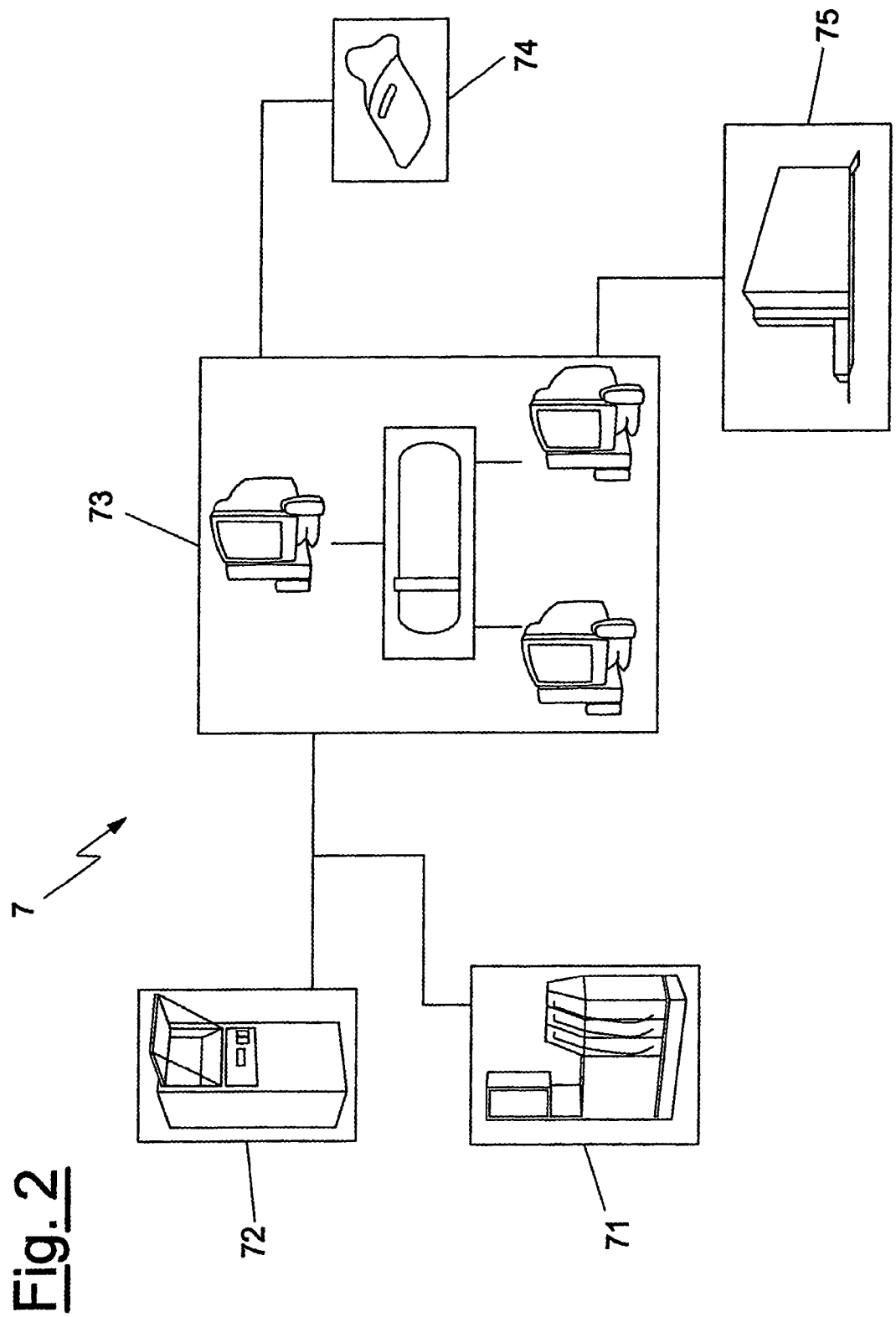
FIG. 2 is a block scheme of the control system according to the present invention applied to a fuel station for motor vehicles.

FIG. 2 shows an application example of the control system according to the present invention, applied to a fuel station for motor vehicles, indicated, as a whole, with reference number (7).

The fuel station includes at least one gasoline pump (71), containing inside said metrological measurement instrument, suitable for measuring the flow of gasoline from a pump. A local processing unit associated with said pump includes said handling application, as described above, which controls the measurement instrument.

Said fuel station also includes an automatic distribution pump (72), suitable for allowing the pumps to operate in the absence of personnel. This pump is activated by inserting a certain amount of money, in the form of banknotes or credit cards, bancomat or similar. Inside this column there is, for example, a further local processing unit.

Other local processing units are situated, for example, in sales and/or distribution points of products (74) of the fuel station, accounting and/or administrative offices (75).

According to the example of FIG. 2, the central processing unit (73) connects the aforementioned local processing units so as to form a network.

According to the present invention, the control application is preferably contained in the central unit (73). Alternatively, if the fuel station is not connected by a network, but comprises at least one local processor associated with a metrological measurement instrument, said control application is installed inside said local unit.

The handling application of the measurement instrument preferably comprises an authenticity certification, which is provided by the application author. This certification includes a digital signature which is implemented, for example, by means of an RSA cryptography protocol.

This digital signature, through a mechanism of public and private keys, guarantees the authenticity of the handling application with which said key is associated.

A technological note which implements said digital signatures is the Microsoft® Authenticode™ technology which verifies that a certain application has a valid certificate, or that the identity of the application producer corresponds to what is certified and that the certificate is still valid. This is achieved by applying a digital signature to the software code, which allows remote clients to check the reliability of the application editor.

According to the present invention, the control application is capable of reading said digital signatures and acknowledging their authenticity. If said authenticity is not verified, the control application emits a signal and interrupts the start of the handling application which contains the non-valid digital signature.

Furthermore, the control application acquires some information on the unit on which the application to be controlled resides, in order to create a single data bank, connected to the unit itself. Possible examples of information which can be useful for controlling the application are:
series number of the network card,
series number of the hard disk,
univocal identification of the data processor, etc.

In the case of network configurations, the control application also univocally identifies the machines connected by the network through their local application component, so as to be able to react to any possible variations in the network configuration.

Once the aforementioned information has been acquired, the control application processes all the data and creates a synthesis of a limited dimension. This synthesis can be obtained, for example, by means of so-called cryptography "hashing" algorithms (SHA,RSA, etc.) and generates a univocal code which is called "software stamp", which is printed from these local units and associated with the controlled handling application.

Figure 3:
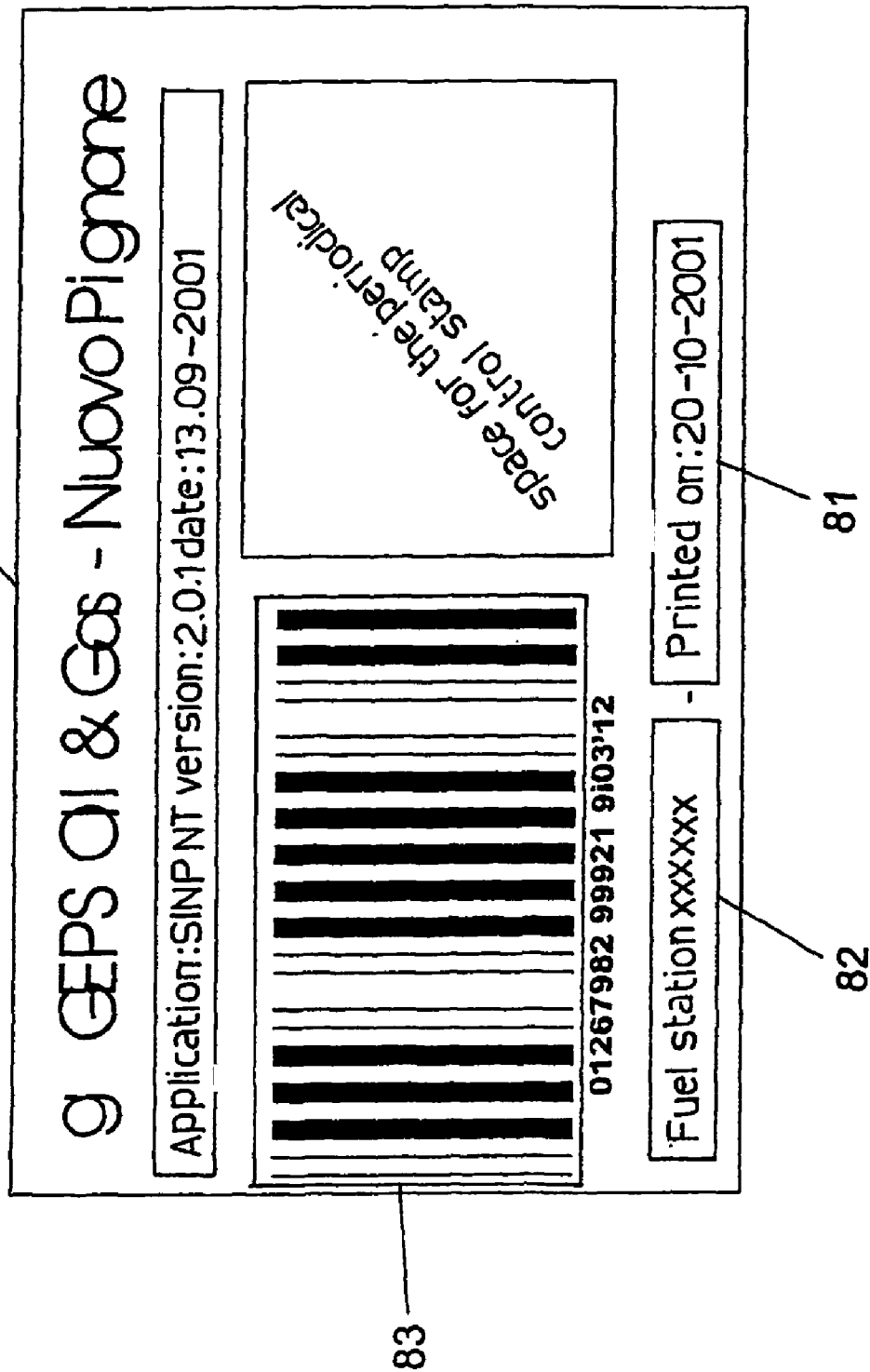
FIG. 3 is a representation of a "software stamp" according to the present invention.

This univocal code is preferably printed, for example, in the form illustrated in FIG. 3, which refers to the certification of a handling application called SINP, version 2.0.1, produced by the same Applicant and granted on Sep. 13, 2001. This stamp (8) also shows a stamp printing date (81), a fuel station code (82), a bar code (83) corresponding to said univocal code of the software stamp.

The handling application operates as follows.

At the start of the handling application (4) to be controlled, the control application (21) is automatically called by means of said dynamic library (6) associated with the handling application in the local unit.

Information on the handling application itself is acquired through said library.

The application is validated using the verification of said application certificate, for example according to the rules of the Microsoft® Authenticode™ standard.

The control application (21) acquires some information on the local processing unit (3) on which the handling application (4) resides, in order to create a single data bank for recognizing the unit itself. In the case of network configurations, the handling application also univocally identifies the other units present on the network, through all dynamic libraries (6) present in each local unit, so as to able to react to any possible variations in the network configuration.

Once all the aforementioned information has been acquired, a "software stamp" is emitted, as described above, which is memorized in said local processing unit and bound to the controlled handling application.

All the applications effected by the control application on the handling application to be controlled, are preferably collected in a file, whose integrity and consistency is checked in order to verify that no cancellations or manipulations have been made. Any possible inconsistencies found in this phase, produce a signal and prevent the start of the applications.

If an updating of the handling application is desired, for example by installing a new version, the control application emits a new software stamp.

In particular, the control application detects that the application has changed and is no longer consistent with the information pre-installed through the software stamp. In this case, the authenticity of the new version of the handling application is checked.

This control is essentially carried out in three steps:
- a control is made that the new version has been prepared by the same producer as the previous one, through said digital signature;
- a control is made that the new version is subsequent to the previous one (for example version 1.2 in the place of version 1.1);
- a control is made that said version is consistent with the other applications, with which it operates, of the local processing unit.

Once the above controls have been effected, the control application proposes to the user to produce a new software stamp. The software stamp represents the necessary evidence, on a normative level, for the correct handling of the issuing of new versions. All the above is obtained, in concrete terms, through a printout on paper which produces a model as illustrated in FIG. 3.

FIGS. 4a-e represent a few examples of insertion and/or visualization masks generated by the control application during a survey on a handling application.

Figure 4A:
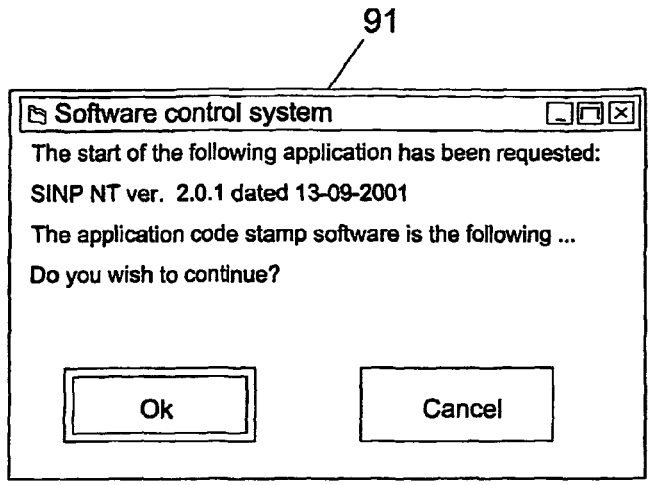
FIGS. 4a-f represent visualization cards of the control application according to the present invention.

FIG. 4a illustrates a first mask (91), which, at the start of the handling application of the measurement instrument, shows the univocal code of the software stamp. In this case, there was no modification in the handling application, and the handling application is consequently correctly started by pushing the key "OK". This mask is optional, in the sense that it can be put in evidence when the handling applications envisage the presence of a user at the start; when the start of the handling application is automatic, for example in correspondence with the tensioning of a plant, this mask is omitted.

Figure 4B:
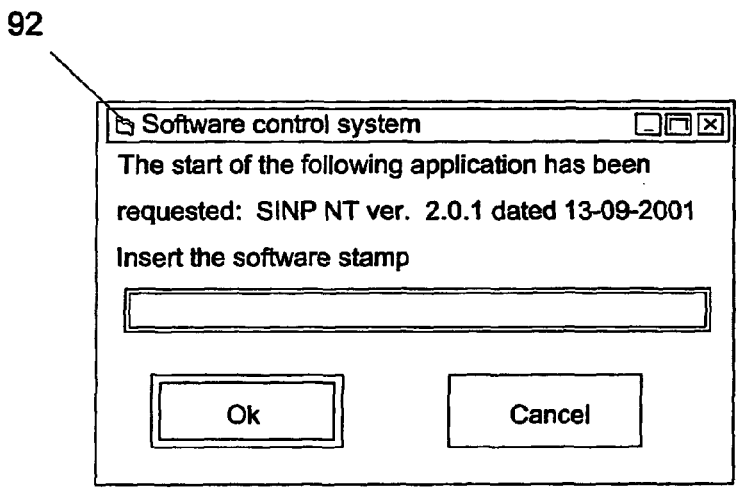
Figure 4C:
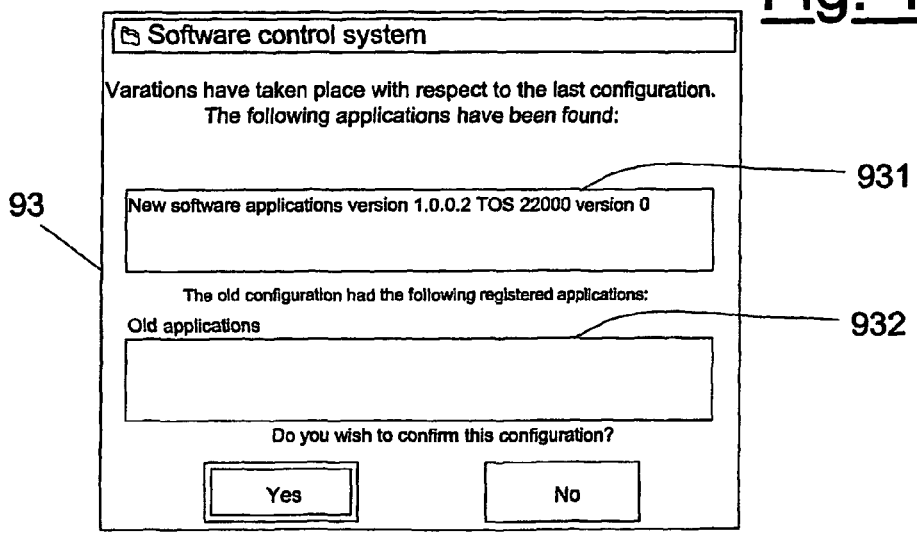
Figure 4D:
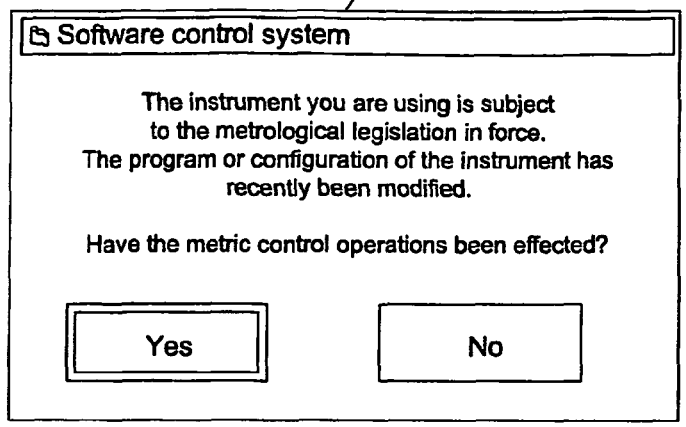
Figure 4E:
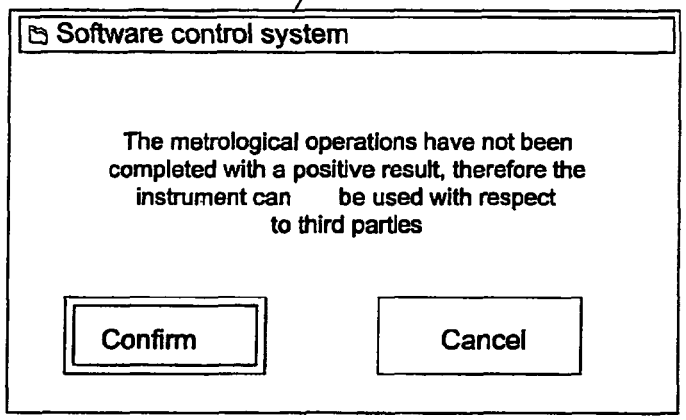
Figure 4F:
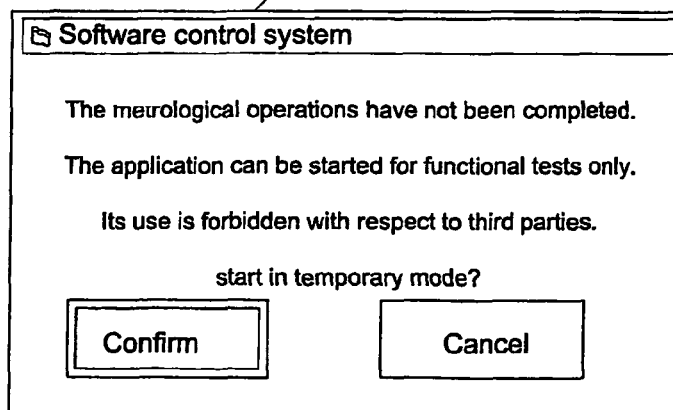

FIG. 4b illustrates a second mask (92), which shows that there has been a change in the configuration of the local processing unit. This change can, for example, be an update of the handling application version or a change in the hardware and/or software configuration of the processing unit.

In this case a comparison mask (93) is put in evidence, in which these changes are listed. In particular, an upper box (931) of said mask reveals the new applications and/or versions of the application present on the local unit, and a lower box (932) reveals the substituted parts. The new configuration revealed by said upper box, must be confirmed by a push button present on the lower part of the card; the confirmation operation simply declares that the changes comply with the aforementioned authentication conditions. After this confirmation, a new univocal code is issued and a new software stamp is printed.

The univocal code can, at this point, be inserted in said second mask (92) and, following confirmation, by pushing the key "OK", the system proposes a third mask (94) in which a confirmation is required (yes/no) that the modifications comply with the regulations on the metric test of the measurement instrument.

In the case of confirmation (yes), the system proposes a fourth mask (95) which communicates that the operations have been correctly effected and allows the correct start of the handling application.

In the case of lack of confirmation (no), the system proposes a fifth mask (96), which communicates the impossibility of correctly starting the application, as the metrological operations have not been completed.

In this case, the application can only be started for effecting functional tests.

The application is preferably developed according to modularity, re-use of the code and portability criteria, in order to guarantee the natural evolution which the control application will undergo during its life cycle.

Respect of these requirements guarantees the possibility of adding new functions with limited impacts. For this purpose, when applicable, the use of programming languages of the type known as "object oriented", is preferable.

It is preferable, moreover, to use techniques which allow the application and the data format to be as independent as possible of each other. In this way, the application is ready for any possible data format changes and is advantageously compatible with other applications, devices or systems.

All public interfaces, public data and functions are documented, in order to guarantee access to the control application code. The system variables preferably have mnemonic names and respect the code writing notations typical of the development environment (prefixes for indicating the data type, etc.). Each public function or method is suitably documented through a description on the function itself, and a functional description is specified for each parameter, including the validity interval and the use in input or output of the parameter itself.

The error codifications are preferably consistent with the remaining parts of the application and can be obtained from a single source (header file or resource). In any case, any error code which can be generated by the application is documented and memorized in the application event register.

Respect of the application longevity requirement inevitably implicates the selection of architectures which are presumably supported for a period of time equal or longer than the assumed life of the application itself.

The control application, according to the present invention, follows the operation modes, terminology and documents already known to users of the handling application and metrological measurement instrument, as much as possible, so that the user itself can consider the procedure as "familiar". In any case, the interfaces and designs of the masks are as simple and clear as possible. The most frequent operations are advantageously effected with the lowest possible number of passages. All operations of the control application are coherently grouped into functional sets, to make them easily available. Access to the functions is preferably obtained by means of buttons or, when applicable, through menus, hyper-tests or icons.

The parts indicating commands or data must have sufficient dimensions to allow them to be clearly read. The dimensions of the interface elements should not however be too large, in order to prevent the elements themselves from becoming dispersive.

The invention claimed is:

1. A control system of an electronic instrument device for metrological measurements, comprising: a handling application operable to control the electronic instrument device; at least one dynamic library associated with the handling application, the handling application operable to identify, through the dynamic library, one or more remote electronic instrument devices in a network of electronic instrument devices including the electronic instrument device through corresponding certification codes uniquely associated with each of the one or more remote electronic instrument devices; and a control application activated through the dynamic library and operable to verify integrity of said handling application, said control application operable to generate a certification code for the handling application in response to verifying that the integrity of the handling application is maintained; wherein the control application is operable to acquire through a network information associated with one or more remote electronic instrument devices having corresponding handling applications, generate corresponding dynamic libraries on the one or more remote electronic instrument devices comprising the information, and authenticate the one or more remote electronic instrument devices using the corresponding certification codes by the corresponding handling applications of the units through the corresponding dynamic libraries.

2. The control system according to claim 1, wherein said code is associated with a stamp comprising an issuing date of said stamp, a reference code of the electronic instrument device for metrological measurements, and a barcode corresponding to said code.

3. The control system according to claim 1, wherein said control application and said handling application are communicably coupled via the network.

4. The control system according to claim 1, wherein said dynamic library is locally stored.

5. The control system according to claim 1, wherein said dynamic library is situated in said central processing unit.

6. The control system according to claim 1, wherein said certification code is obtained using a cryptography algorithm.

7. A method for monitoring an electronic instrument device for metrological measurements, comprising: a processor operable for receiving information associated with a handling application for the electronic instrument device and locally stored, the handling application operable to control the instrument; issuing a certification code associated with the handling application based on the information and operable to indicate that integrity of the handling application has been maintained; identifying, by the handling application through one or more dynamic libraries associated with the handling application, one or more remote electronic instrument devices in a network of a plurality of electronic instrument devices including the instrument through corresponding certification codes uniquely associated with each of the one or more remote electronic instrument devices; acquiring through a network, data associated with one or more remote electronic instrument devices having corresponding handling applications, generating corresponding dynamic libraries on the one or more remote electronic instrument devices comprising the data, and authenticating the one or more remote electronic instrument devices using the corresponding certification codes by the corresponding handling applications of the units through the corresponding dynamic libraries.

8. The method according to claim 7, wherein producing a code includes processing said information using a cryptography algorithm.

9. The method according to claim 7, wherein the received information comprises an authenticity certificate of the handling application.

10. The method according to claim 7, wherein the received information comprises an acknowledgment code of said electronic instrument device.

11. The system of claim 1, wherein the controller is further operable to generate an alert in response to determining a violation of the integrity of the handling application.

12. The system of claim 11, wherein the violation comprises an unregistered modification of the handling application.

13. The system of claim 1, wherein the controller is further operable to prevent the handling application from operating in response to determining the violation.

14. The system of claim 1, wherein the controller is further operable to verify whether a certification associated with the handling application is valid.

15. The system of claim 14, wherein the certification is verified using a digital signature.

16. The method of claim 7, further comprising: determining a violation of the integrity of the handling application; and generating an alert in response to the violation.

17. The method of claim 16, further comprising preventing the handling application from operating in response to determining the violation.

18. The method of claim 7, further comprising: determining that a certification associated with the handling application is invalid; and generating an alert in response to the determining the invalidity.

19. The method of claim 7, further comprising generating a stamp indicating that the integrity of the handling application is verified.

20. The method of claim 7, wherein the information is received at the start of the handling application.

21. The method of claim 7, wherein the cryptography algorithm comprises one of a Secure Hash Algorithm (SHA) hashing algorithm or an RSA hashing algorithm.

* * * * *